April 9, 1957     H. WURZEL ET AL     2,787,926
ATTACHMENT FOR GROOVING TOOLS
Filed Jan. 2, 1953     3 Sheets-Sheet 1
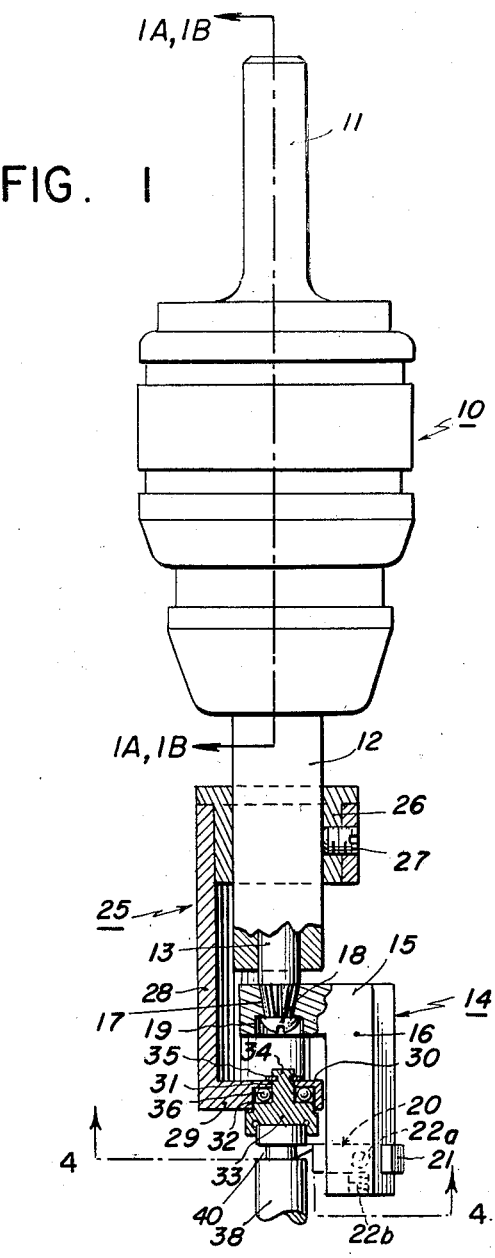
FIG. 1
FIG. 2
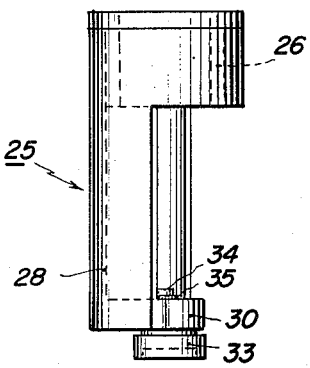
FIG. 3
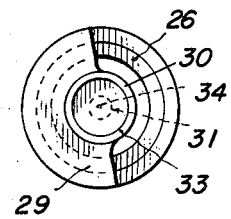
FIG. 4
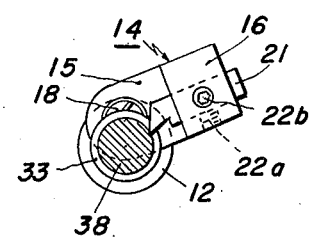
FIG. 5
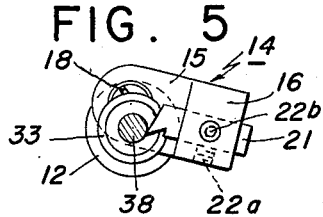
INVENTORS
HUGO WURZEL &
BY MELVIN MILLHEISER
ATTORNEY April 9, 1957  H. WURZEL ET AL  2,787,926
ATTACHMENT FOR GROOVING TOOLS
Filed Jan. 2, 1953  3 Sheets-Sheet 3

INVENTORS
HUGO WURZEL &
MELVIN MILLHEISER
BY
ATTORNEY

United States Patent Office 2,787,926
Patented Apr. 9, 1957

2,787,926

ATTACHMENT FOR GROOVING TOOLS

Hugo Wurzel and Melvin Millheiser, Bronx, N. Y., assignors to Waldes Kohinoor, Inc., Long Island City, N. Y., a corporation of New York Application January 2, 1953, Serial No. 329,328

5 Claims. (Cl. 82—2)

This invention relates to an attachment for grooving tools and is more particularly concerned with an attachment for an internal grooving tool capable of converting it for use as an external grooving tool.

As is well known, a so-called internal grooving tool is employed in the machining or grinding of grooves, recesses, chamfers and the like into the cylindrical bore surface of a housing or similar tubular work-piece. Where the grooves are to serve as seats for internal retaining rings which function as artificial shoulders for preventing axial displacement of a machine part mounted in the housing bore relative to the housing, such must be accurately located axially of the bore and must also have exactly predetermined depth. The construction of a tool for machining such grooves and providing both the necessary accuracy and adjustability as to groove location and groove depth earlier offered particular difficulties, but these have been satisfactorily solved by an internal grooving tool of the type disclosed in the patent to Hall No. 2,411,-426, dated November 19, 1946, in connection with which the present invention will be described. However, it is to be understood that an attachment according to this invention may be applied to any other than the Hall type of internal grooving tool to which it is or may be physically adapted.

With the above in view, a general object of the invention is to provide an attachment for an internal grooving tool which will enable it to function as an external grooving tool, that is to say, to machine or grind grooves, recesses, chamfers, etc. in the external surface of a shaft, pin or similar machine part, while at the same time preserving all of the advantages of the internal grooving tool to which it is applied, with respect to adjustability to different size work-pieces, different axial location of the groove, and different groove dimensions.

A more detailed object of the invention is to provide an attachment for a known type of internal grooving tool capable of converting same to use as an external grooving tool through a simple interchange of parts.

A further object of the invention is the provision of an attachment for an internal grooving tool which may be substituted for the cutter and the gage head of the latter in a simple operation, and which thereupon renders the tool effective to cut grooves, recesses, chambers, etc. in the external surface of a work-piece such as a shaft, pin or the like.

Yet another object of the invention is an attachment for internal grooving tools functioning as aforesaid, which may be simply and inexpensively manufactured, quickly assembled on and disassembled from an internal grooving tool and which enables such an internal tool to perform in effective and thoroughly dependable manner as an external grooving tool.

The above and other objects and advantages of a grooving tool attachment according to the invention will appear from the following description, taken with the accompanying drawings illustrating various physical forms which the attachment may take, as well as the manner in which it operates, in which:

Fig. 1 is an elevation view, partly in section, illustrating the attachment of the invention applied to a known type of internal grooving tool and converting same for use as an external grooving tool;

Figs. 1A and 1B are sections taken on line 1–AB—1–AB of Fig. 1 but with the tool body turned about 90° from its Fig. 1 position, which illustrate the eccentricity of tool shaft and spindle and the mechanism for imparting limited angular movement to the tool shaft about its own axis responsively to lowering of the tool body relative to the tool spindle, Fig. 1A showing the normal retracted positions of the components of said mechanism, and Fig. 1B showing the position of the components at the end of a grooving operation, as in Fig. 1;

Fig. 2 is a detail elevation view of the adapter part of the attachment which also functions as a work-piece centering means;

Fig. 3 is an underneath view of the adapter illustrated in Fig. 2;

Fig. 4 is a section taken on a line corresponding to line 4—4 of Fig. 1, illustrating the position of the attachment parts with respect to the work-piece at the beginning of a grooving operation;

Fig. 5 is a view similar to Fig. 4, illustrating the position of the attachment parts at the end of the cutting operation;

Fig. 8 is a view similar to Fig. 7 but illustrating the grooving tool and attachment set up for machining a chamfer at the end of a shaft, pin or the like.

Figure 6:
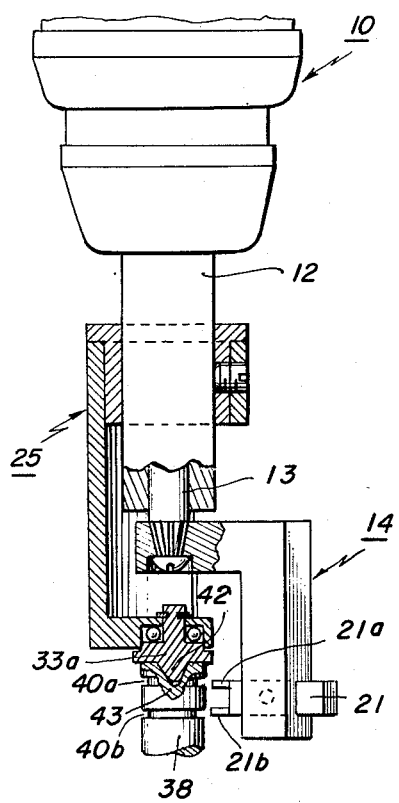
Figs. 6 and 7 are part-sectional elevational views similar to Fig. 1 but illustrating variant forms of the adapter part of the attachment.

Inasmuch as the attachment of this invention will be described in its application to a known internal grooving tool for example, a tool of the type shown in the aforesaid United States patent to Hall No. 2,411,426, a detailed description of the parts and operation thereof is believed to be unnecessary, particularly since the tool per se forms no part of the present invention. Suffice it to say that such a tool generally comprises a tool body 10 having a shank 11 extending upwardly therefrom and which is adapted to be suitably mounted in and rotated by the chuck of a drill press, thereby to drive a tool spindle 12 through a suitable drive transmission mechanism to be generally described, which is contained within the tubular shell of the tool body. Operatively associated with the spindle 12 and being preferably contained within an open-ended bore extending longitudinally through said spindle so that its axis extends parallel to the spindle axis is a tool shaft 13. Accordingly, rotation of the spindle causes the tool shaft 13 to revolve about the spindle axis. The aforesaid tool shaft 13 extends beyond the lower end of the spindle 12 and its projecting end is preferably conically shaped and splined to receive and drivingly connect with a tool mounting member 14 to be described in detail and which forms one component of the attachment of the invention. In addition to its revolvable movement about the axis of the spindle 12, the tool shaft is also mounted and supported in the spindle for limited angular (swinging) movement about its own axis, such angular movement being imparted to it by means of a cam mechanism as disclosed in the aforesaid Hall Patent No. 2,411,426 and which is housed within the aforesaid shell of the tool body 10.

Figure 1A:
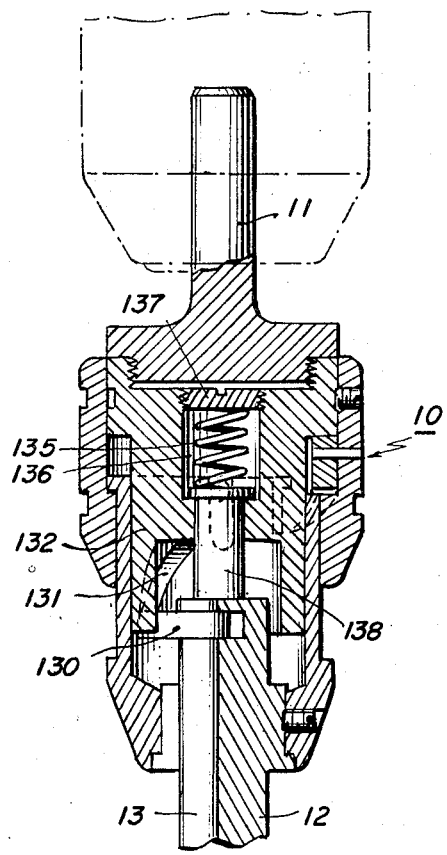
Figure 1B:
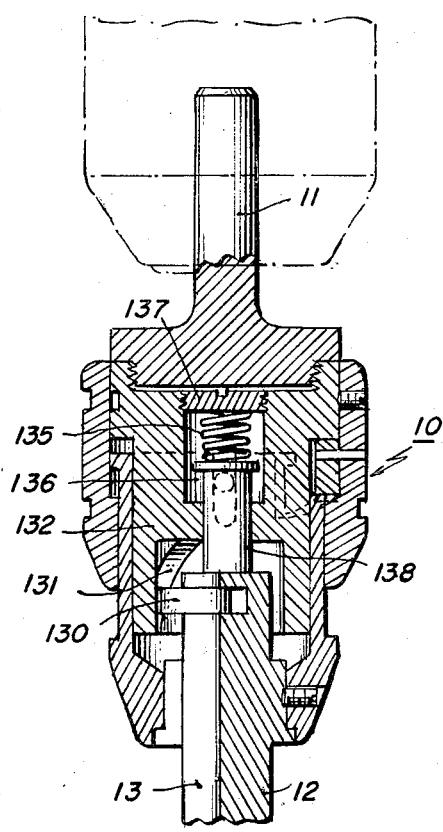

Such cam mechanism is illustrated in Figs. 1A and 1B, wherein it will be seen that the tool shaft 13 is provided at its upper end with a cam follower 130 which projects laterally into and rides on the edges of a cam slot 131 extending from the lower edge and upwardly through the circular wall of a tubular cam member 132 at a suitable angle of about 30°. Accordingly, movement of the cam member 132 in downward direction relative to the cam follower 130 imparts limited angular movement about its axis to the tool shaft 13. The aforesaid cam member 132 is threadedly affixed at its upper end to the lower driving headend of the tool shaft 11 substantially as shown and hence rotation of the drill chuck in which the shank is mounted effects rotation of the cam member and thereby, through the cam follower 130 which now acts as a driving key between cam member and spindle 12, of said spindle as well.

It will also be understood that downward movement of the cam member 132 which effects turning of the tool shaft 13 on its own axis in one direction is preferably brought about by the manual operation of the drill press as is usually involved in feeding a drill into the work. Return swinging movement of said tool shaft is preferably effected by a spring 135 contained in an axial bore 136 provided in the upper end of the cam member 132, which spring is reactive between a screw plug 137 closing the upper end of said bore and the headed upper end of a pin 138 whose lower end projects through the body of said cam member and bears on the upper end of the spindle 12 substantially as shown. Since the spring 135 normally urges the cam member upwardly and the cam follower downwardly, it follows that when it is compressed upon downward movement of the cam member with respect to spindle and cam follower, it tends to swing the tool shaft 13 through its return movement.

Illustratively and as seen in Fig. 1, the aforesaid tool mounting member 14 has angular formation so that, when assembled to the projecting end of the tool shaft 13, one arm 15 thereof extends transversely of said tool shaft and spindle, and the other arm 16 extends vertically downwardly and in offset, parallel relation with respect to both the spindle and tool shaft. While said member 14 is shown to be integrally constructed, its arms 15, 16 may be formed separately and rigidly affixed to one another by suitable means. As also seen in Fig. 1, the transverse arm 15 is provided at its inner or free end with a tapered and splined hole 17 adapted to receive the correspondingly tapered and splined projecting end of the tool shaft 13, and is adapted to be rigidly yet detachably secured to the tool shaft as by means of a set screw 18 whose head seats in a recess 19 formed in the under surface of the arm. Adjacent its lower end, the vertical arm 16 of said member is provided with a transverse hole 20 adapted to receive an inwardly projecting tool 21 herein illustrated as a blade-type cutting tool. The cutting tool is removably secured to the arm 16 in suitably adjusted position, as by means of set screws 22a, 22b. With the construction so far described, it will be understood that the tool mounting member 14, being affixed to the tool shaft, partakes of the revolvable or orbital movement of said tool shaft about the axis of the spindle 12, and that it also partakes of any rotary (angular) movement of the tool shaft 13 about the axis thereof.

The other part 25 of the attachment, which for convenience is hereinafter referred to as an adapter, serves numerous functions including, in the first instance, those of adapting the tool to different diameters and end shapes of work-piece, and also of centering the work-piece on the axis of the spindle 12, as will be hereinafter explained. Illustratively, the adapter 25 comprises a collar 26 adapted to be slipped over the end of the spindle 12 and thereupon secured thereto as by a set screw 27, it being observed that the position of the collar may be adjusted along the axis of said spindle. The collar 26 is rigid with the upper end of a body or arm member 28, which preferably has the form of a semi-cylindrical sleeve terminating at its lower end in a transversely disposed bottom arm or wall 29, which latter, by reference to Figs. 2 and 3, is part circular and provided with a central bearing portion 30.

As best seen in Figs. 1 and 3, the bearing portion 30 is provided with a hole 31 and with a circular, downwardly facing recess 32, both disposed on the axis of the spindle 12. A work-piece centering member 33 is journaled for rotation in the recess 32 and in the Fig. 1 construction, said member has the form of an inverted cup provided with an upward axial stem 34 which projects through the aforesaid hole 31, and being secured in place as by means of a retaining ring 35. Preferably, the cup-shaped centering member 33 is mounted on ball bearings 36, whereby it may turn freely with respect to the adapter 25, and vice versa. As also seen in Fig. 1, the downwardly opening recess of the cup-shaped centering member 33 is circular in formation and dimensioned as to snugly receive the end of a work-piece 38, illustratively a shaft but which may be a pin, spindle or the like.

With the work-piece centering member 33 disposed and rotatable on the axis of the spindle 12, it will be appreciated that the adapter 25 functions to center the work-piece 38 to the axis of the spindle 12, and that the mounting of the work-piece centering member in ball bearings further permits the adapter 14 to turn freely with the spindle relative to the work-piece which, of course, has fixed position. It is also to be noted that the distance between the bottom of the recess of the work-piece centering member 33 and the cutting edge of the cutter 21 determines the axial location of the groove being cut along the length of the work-piece 38. Since the level of the bottom surface of said recess is determined by the position at which the adapter collar 26 is secured to the spindle 12, it becomes apparent that the axial location of the groove may be predetermined by the simple operation of securing the adapter to the spindle in a proper position of axial adjustment with respect thereto. Hence, the adapter 25 also functions to adapt the attachment as a whole to the cutting of grooves at different locations along the axial length of the work-piece 38.

The operation of an attachment as aforesaid will be seen from the above description, with reference being had to the aforesaid Hall Patent No. 2,411,426. To cut a groove 40 in the work-piece (shaft) 38, the tool is set up in axial alignment with said shaft and the tool mounting member 14 with cutter 21 of required type and size is secured to the tool shaft 13 by means of set screw 18. Thereupon, adapter 25, which has previously been shifted over the spindle end, is secured in desired position of axial adjustment on spindle 12 by the set screw 27, such position of securement being predetermined in accordance with the desired axial location of the groove to be cut. Thereupon, the drill press is put into operation, such resulting in rotation of the spindle and revolution of the tool mounting arm 16 and cutting tool 21 about the shaft 38, the cutting tool being in its normal non-cutting position. Thereupon, the tool 10 is translated downwardly until the end of the shaft 38 seats in the recess of the cup-shaped centering member 33. Upon this position being reached, further downward movement of the spindle 12 is prevented by the fixed work-piece, but the tool body 10 may be lowered relatively to said spindle through the provision of the cam mechanism shown in Figs. 1A and 1B, with such relative lowering of the tool body providing limited angular rotation of the tool shaft 13 about its own axis. Such rotation results in the tool mounting member 14 and cutting tool 21 partaking of angular movement about the axis of the tool shaft 13 from its normal non-cutting position as shown in Fig. 4 to an innermost position shown in Fig. 5. Such movement is predetermined to the desired depth of the groove and results in the cutting edge of the tool feeding into the shaft 38 and thereby cutting the groove 40 to the required depth therein. After the groove has been cut, rotation of the spindle is interrupted, the tool mounting member 14 and tool 21 thereupon retracting to the non-cutting position under the urge of the aforesaid spring 135 (Figs. 1A and 1B), and the tool 10 with attachment may then be raised from the work.

Fig. 6 illustrates a somewhat modified form of adapter, according to which the work-piece centering member 33a, rather than being formed cup-shaped as in the prior modification, is provided with a conical point 42, which is adapted to center in a correspondingly shaped recess 43 formed in the end of the work-piece. It will be noted that in Fig. 6 the cutting tool 21 is provided with two cutting blades 21a, 21b and hence is adapted to cut two parallel grooves 40a, 40b into the work-piece, rather than the single groove 40 as previously described.

Figure 7:
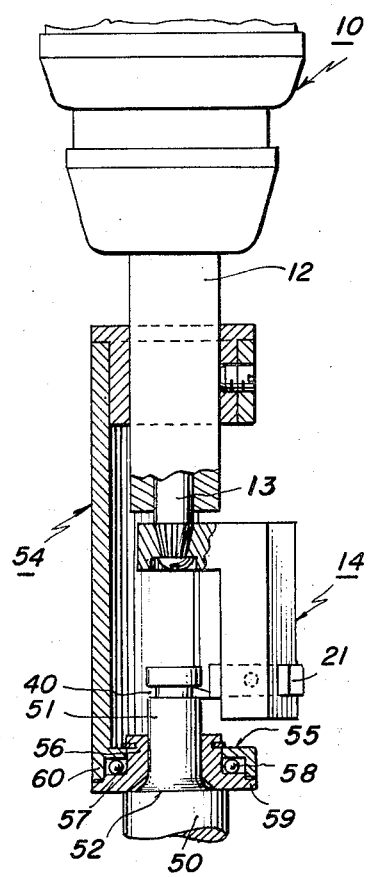

Fig. 7 illustrates a variant form of adapter for use in centering a work-piece (shaft) 50 having a reduced diameter end 51, whose formation results in a shoulder 52. This shoulder provides an abutment for the adapter 54, whose end wall 55 (corresponding to the adapter end wall 29 of the Fig. 1 modification), mounts a work-piece centering member in the form of a collar 56 for receiving the shaft end 51 and having a radial flange 57, the collar and its flange turning on roller bearings 58. Preferably, the rim of the flange 57 is stepped as at 59, to receive an axial flange 60 formed on the adapter end wall 55.

Assuming the groove 40 to be cut in the reduced diameter end 51 of the shaft 50, as illustratively shown, its precise location is determined by securing the adapter 54 to spindle 12 in position as to space the cutting tool 21 the proper distance from the shoulder 52, which is determined by the point in the lowering movement of the tool 10 at which the collar 56 abuts said shoulder. Since the adapter 54 is adjustably secured to the spindle, the location of the groove may be correspondingly varied.

Figure 8:
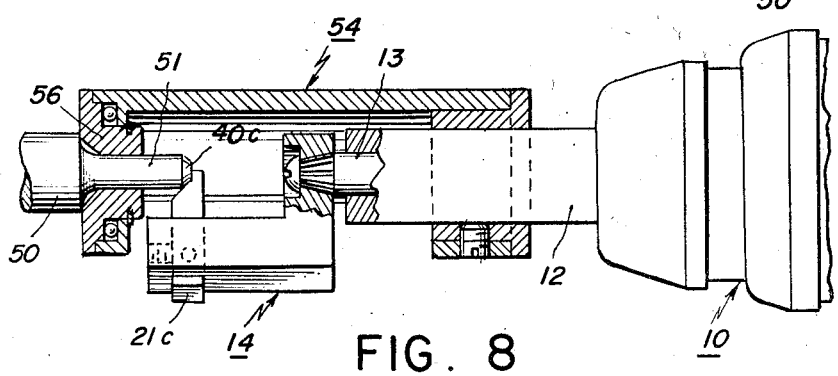

Fig. 8 illustrates the application of an attachment as described to the cutting of a chamfer 40c at the end of the reduced diameter shank portion 51 of a work-piece (shaft). The adapter 54 is similar to that illustrated in Fig. 7, but an appropriate chamfering tool 21c is employed in place of the blade-type cutter 21. It will be understood that revolution of the attachment, accompanied by inward feeding movement of the tool 21c, responsive to rotation imparted the tool shaft 13, results in the cutting of a chamfer, rather than a groove, as previously described.

Without further analysis, it will be appreciated that the invention provides an attachment for a so-called internal grooving tool which converts same, following a simple exchange of parts, for use as an external grooving tool, i. e. a tool for cutting or grinding grooves, recesses, chamfers and the like in the external surface of a work-piece, while at the same time preserving all of the advantages of the internal grooving tool with respect to its adjustability to different sizes of work-piece, different groove locations, and different groove depths. An internal grooving attachment according to the invention is also notable for the simple, rugged and thoroughly dependable construction of its component parts and the ease with which they may be assembled on a known internal grooving tool, in substitution for the cutting tool and gage head thereof. When assembled on said internal groove tool, the present attachment is also characterized by substantial compactness, providing safe operation due to a minimum outside working dimension, features of advantage resulting from the fact that the tool mounting and adapter and centering means are more or less symmetrically disposed to opposite sides of the tool spindle, and that the transverse arm 15 of the tool mounting means extends into the semi-cylindrical sleeve member 28 constituting the body of the adapter, so as to be in effect housed thereby. It is also to be noted that with the Figs. 7 and 8 forms of adapter, the cutting tool is also in effect housed by the adapter, since it lies within the circular path of of rotation thereof.

As many changes could be made in carrying out the above constructions without departing from the scope of the invention, it is intended that all matter contained in the above description or shown in the accompanying drawings shall be interpreted as illustrative and not in a limiting sense.

We claim:

1. In apparatus of the character described, the combination of a rotary spindle, a tool shaft extending longitudinally through and having an end projecting from the spindle and being disposed with its axis offset from that of the spindle, whereby to revolve about the spindle axis when the spindle is rotated, and being also turnably mounted in the spindle for angular motion about its own axis; attachment means comprising a tool mounting member having one end affixed to the projecting end of the tool shaft, whereby said member partakes of the revoluble and angular motion of said tool shaft, and further having a depending portion which is laterally offset from the spindle and is provided adjacent its free end with means for securing a tool in position such that it is directed laterally inwardly towards the extended axis of the spindle and is substantially spaced in axial direction from said spindle, and a work-piece centering member having an affixing collar at one end for affixing same to the spindle in a desired predetermined axial position therealong, an arm depending from the collar beyond the end of the spindle and being laterally offset therefrom and to the opposite side of said spindle from the tool mounting member and terminating at its other end in an inwardly directed end portion, and a work-piece engaging element adapted to be engaged with the end of the work-piece and being journaled in said end portion for relative rotation with respect to said centering member about the extended axis of the spindle; and means for rotating said spindle, said means being also operable to impart limited angular movement of the tool shaft and thereby corresponding angular movement of the tool toward the work-piece.

2. The combination substantially as set forth in claim 1, wherein said tool mounting member comprises angularly related arms, one arm being affixed at its free end to the tool shaft and extending transversely thereof, the other arm depending from said one arm and being disposed parallel to the axis of the spindle and work-piece centered therewith and provided at its free end with means for adjustably and interchangeably mounting said tool; wherein said work-piece centering member comprises a part-cylindrical sleeve disposed about and arranged coaxially with the spindle and mounting said affixing collar at one end thereof, the sleeve being provided at its other end with an end wall providing said end portion in which the work-piece engaging element is journaled; and wherein said element is cup-shaped whereby it is adapted to receive in its recess the end of the work-piece.

3. The combination substantially as set forth in claim 1, wherein said tool mounting member comprises angularly related arms, one arm being affixed at its free end to the tool shaft and extending transversely thereof, the other arm depending from said one arm and being disposed parallel to the axis of the spindle and work-piece centered therewith and provided at its free end with means for adjustably and interchangeably mounting said tool; wherein said work-piece centering member comprises a part-cylindrical sleeve disposed coaxially with the spindle and mounting the affixing collar at one end thereof, the other end extending a predetermined distance beyond the spindle and terminating in a transverse end wall providing said end portion in which said work-piece engaging element is journaled; and wherein said element comprises a collar coaxial with said spindle and being adapted to receive a reduced end on the work-piece and to abut the shoulder between the work-piece and its reduced end.

4. The combination substantially as set forth in claim 1, wherein the axial length of the tool mounting member is that required to position the tool beyond said other end of said work-piece centering member.

5. The combination substantially as set forth in claim 1, wherein the axial length of the tool mounting member is that required to position the tool intermediate the spindle and said other end of the work-piece centering member.

References Cited in the file of this patent

UNITED STATES PATENTS

| | | |
|---|---|---|
| 312,521 | Sharp | Feb. 17, 1885 |
| 739,501 | Meyers | Sept. 22, 1903 |
| 1,193,426 | Rollinson | Aug. 1, 1916 |
| 1,331,322 | Connell | Feb. 17, 1920 |
| 2,411,426 | Hall | Nov. 19, 1946 |
| 2,520,639 | Johnson | Aug. 29, 1950 |